Nov. 22, 1955 W. W. GRAHAM 2,724,229
ROTARY LAWN TRIMMER WITH SKIDS
Filed July 31, 1952
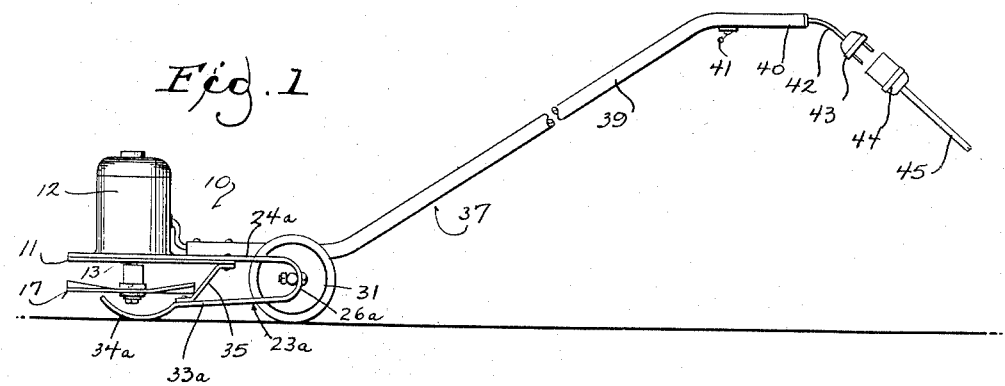
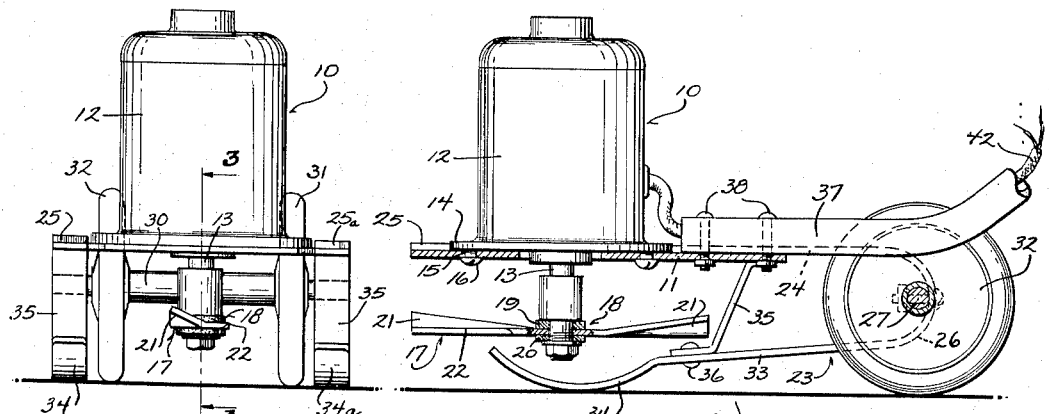
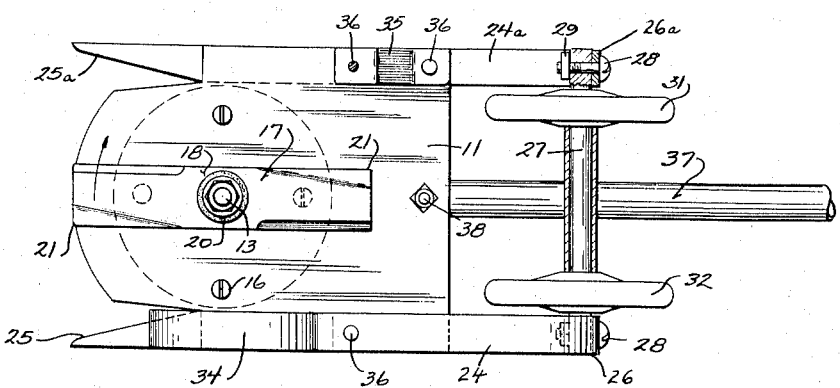
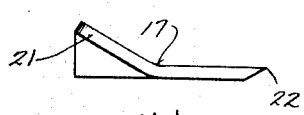
INVENTOR.
WALLIS W. GRAHAM
BY
Gerald P. Welch
ATTORNEY

United States Patent Office 2,724,229
Patented Nov. 22, 1955

2,724,229

ROTARY LAWN TRIMMER WITH SKIDS

Wallis W. Graham, Milwaukee, Wis.

Application July 31, 1952, Serial No. 301,939

1 Claim. (Cl. 56—25.4)

This invention relates to improvements in rotary lawn trimmers, and more particularly to a novel rotary lawn trimmer having economical and efficient structural features.

An object of the invention is to provide a device of the type having a novel rotary blade provided with a downwardly directed bevel on its cutting edge.

Another object of the invention is to provide a device of the type having a frame provided with laterally disposed and forwardly directed fingers for diverting blades of grass and the like into the path of the cutter.

Other and further objects of the invention will appear as the description proceeds, reference being had to the accompanying drawings, in which:

Fig. 1 is a side view in elevation of a lawn trimmer embodying the invention.

Fig. 2 is an enlarged front view in elevation of the same.

Fig. 3 is a sectional view taken on line 3—3 of Fig. 2.

Fig. 4 is an inverted plan view of the same with parts broken away and shown in section.

Fig. 5 is an enlarged end view in elevation of the cutter blade.

Referring more particularly to the drawings, the numeral 10 refers to the device generally, having a base plate 11 horizontally disposed on which is mounted an axially vertical motor 12 with a drive shaft 13 extending downwardly through said base plate 11. The motor 12 has an annular base flange 14, the base plate 11 is apertured as at 15 to accommodate the threaded means 16 securing said flange 14 and motor 12 thereto. A double ended centrally mounted blade 17 is carried at the lower end of the shaft 13 by means of a slip clutch mechanism 18 including the leather washers 19 and 20.

Each end of the blade 17 has an angularly upturned trailing edge 21 and a horizontal leading cutting edge 22 beveled on the lower side thereof to facilitate an upward glancing movement on striking a stone or other obstruction during use thereof.

A pair of side frame members 23 and 23a each have a horizontal top bar 24 and 24a affixed to the top side marginal edge of the plate 11. Frontally and integrally formed on each bar 24, 24a is an inwardly bevelled finger 25, 25a. Rearwardly of each bar 24, 24a is an integrally formed downwardly disposed arcuate portion 26, 26a, carrying centrally and horizontally thereof the ground-bearing wheel shaft 27 secured thereto by bolts 28 and nuts 29.

A spacer sleeve 30 separates the ground-bearing wheels 31 and 32. The arcuate portions 26 at their lower ends have the integrally formed and forwardly extending bar portions 33, 33a terminating in the arcuately formed runner elements 34, 34a. Each bar 24, 24a and bar 33, 33a is connected by a strut 35 secured at each end by rivet or other means 36.

A tubular handle member 37 is secured by bolt or other means 38 to the upper side of the base plate 11, centrally longitudinally at the rear end thereof horizontally for a portion of its length. An integral portion 39 extending upwardly therefrom at an obtuse angle is surmounted by a relatively short hand piece 40 also integral therewith and provided with conventional switch means 41. A wire conduit 42 extends throughout the tubular handle member and is provided with an end plug 43 for contact with the socket 44 on the electric cord 45.

In use, the electrical motor 12 when energized will rotate the blade 17 at a high rate of speed. The upwardly angled trailing edges 21 will exert a strong suction force upwardly to lift blades of grass and the like into a position for efficient cutting thereof. The inwardly beveled fingers 25 may be guided along a fence or wall and will divert grass or weeds away from such surface into the path of the blade 17 for cutting.

It will be understood that the device is capable of many modifications in structure and design, without departing from the spirit of the invention, within the scope of the appended claim.

Having thus described the invention, what is claimed and desired to be secured by Letters Patent of the United States, is:

A lawn trimmer including a rectangular body plate, an electric motor mounted thereon, the rotor shaft of said motor extending downwardly through said plate, a horizontal cutter element fixed for rotation on said shaft, a pair of spaced parallel strap elements attached by one end to said plate and extending rearwardly of said motor and cutter, arced portions of said straps extending downwardly from and integral with the plate attached portions and with forward return portions spaced from said plate terminating frontally in a pair of integral convex ground-bearing strap runners, a horizontal axle fixed centrally transversely of said arced strap portions, and a pair of ground-bearing wheels journaled on said axle.

References Cited in the file of this patent

UNITED STATES PATENTS

| | | |
|---|---|---|
| 2,149,463 | Orr | Mar. 7, 1939 |
| 2,225,139 | Urschel | Dec. 17, 1940 |
| 2,404,504 | Klose | July 23, 1946 |
| 2,478,558 | Beranek et al. | Aug. 9, 1949 |
| 2,597,774 | Britten III | May 20, 1952 |